Oct. 4, 1932. J. TREIBER 1,881,334

PROCESS OF MAKING RAZOR BLADES

Filed Aug. 23, 1929 2 Sheets-Sheet 1

INVENTOR.
Julius Treiber
BY
ATTORNEYS.

Oct. 4, 1932.  J. TREIBER  1,881,334
PROCESS OF MAKING RAZOR BLADES
Filed Aug. 23, 1929  2 Sheets-Sheet 2
Fig. 5.  Fig. 6.
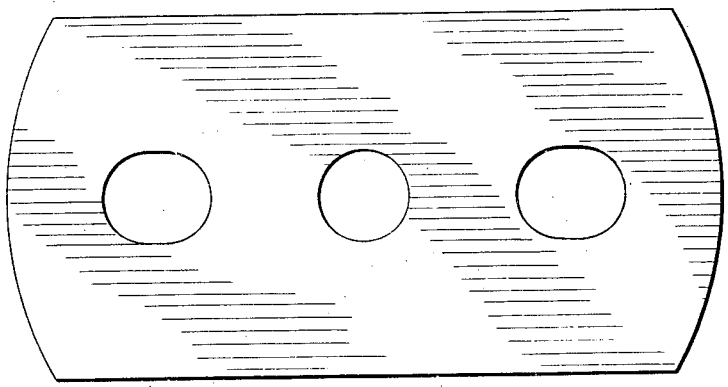
Fig. 7.  Fig. 8.
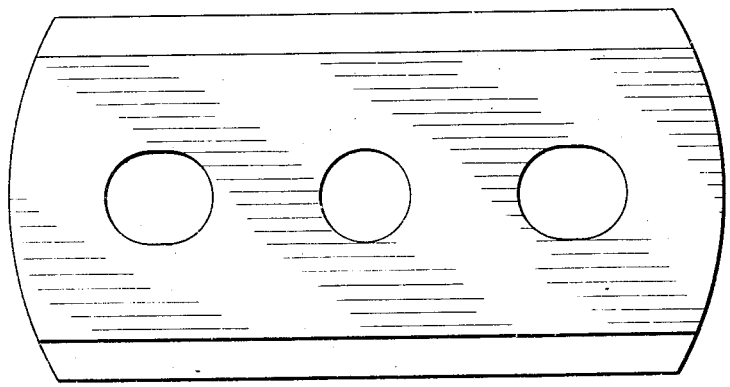
Fig. 9.  Fig. 10.
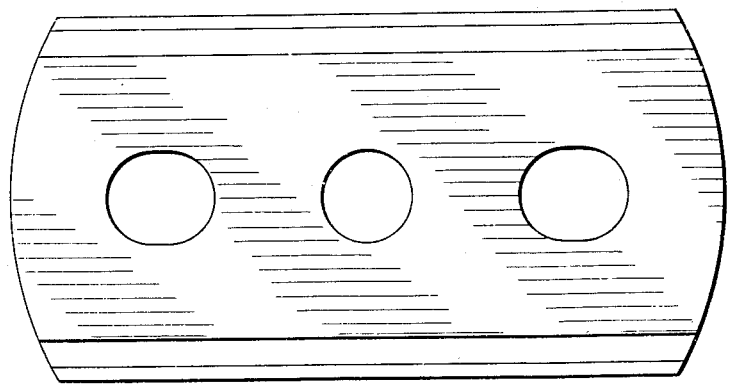
INVENTOR.
Julius Treiber
BY
ATTORNEYS.

Patented Oct. 4, 1932

1,881,334

UNITED STATES PATENT OFFICE

JULIUS TREIBER, OF SOLINGEN, GERMANY

PROCESS OF MAKING RAZOR BLADES

Application filed August 23, 1929, Serial No. 387,839, and in Germany December 15, 1928.

My invention has for its object a new razor blade and a process for manufacturing it.

All the known razor blades generally have a thickness of 0.15 mm. This thickness has been proved to be the most favorable, as on the one hand a blade of this thickness possesses a sufficient elasticity and, on the other hand, does not get warped when hardened, and, finally, it can easily be rolled and hardened. This thickness of the blade, however, requires two independent grinding operations, because one single grinding operation requires too much time when a fine-grained grinding disk is used, while no sufficiently clean and fit cutting facet is obtained when a coarse-grained disk is used.

Now the object of my invention is a razor blade that possesses all the above advantages but requires one sole grinding operation only. This object is obtained by the fact that my improved blade in the range of the cutting edge is thinner than on its middle portion, and the cutting facet can now be produced in a satisfactorily short time by means of a finely grained grinding disk or disks. Grinding by the use of a coarsely grained preliminary grinding disk and a finely grained finishing disk is no longer necessary.

According to my process the blade is etched along their cutting edges on a determined width to such an extent that its thickness is reduced by about one third. In the range of its cutting edges the blade has then a thickness of about 0.1 mm.

Figure 1:
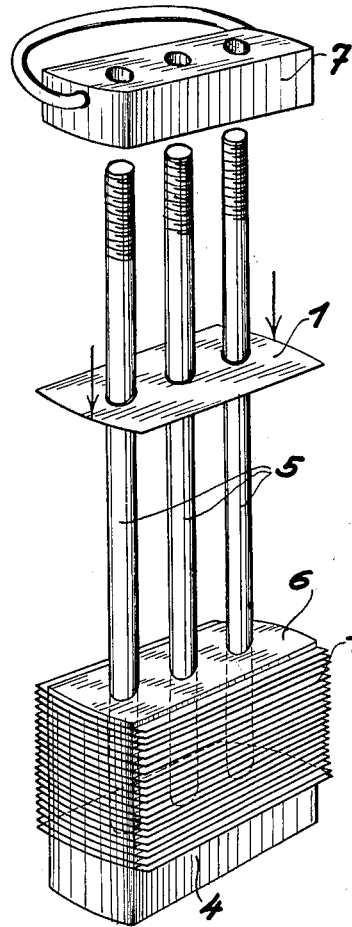
Figure 2:
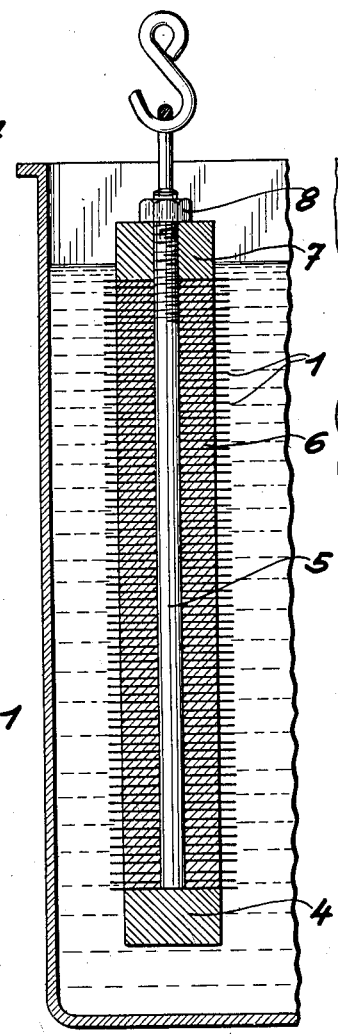
Figure 3:
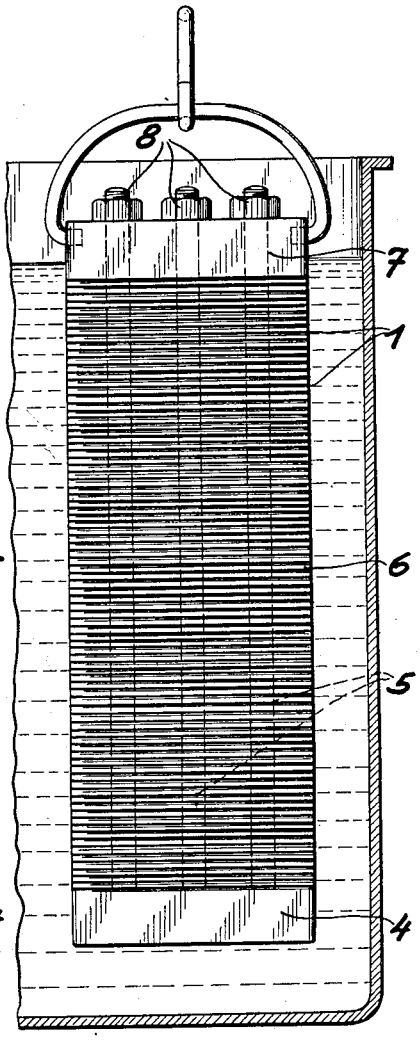
Figure 4:
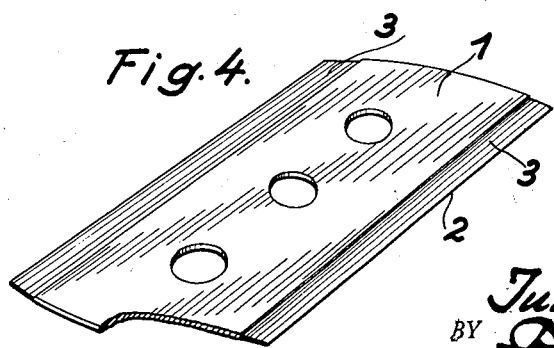

In order that my invention can be more easily understood, an appliance serving to carry out my manufacturing process is illustrated in the accompanying drawings in which Figure 1 is a perspective view of the appliance, Figure 2 is a front view thereof, Figure 3 is a corresponding side view, Figure 4 is a view of my new razor blade on an enlarged scale, Figure 5 is a plan view of the blank from which the razor blade is made, Figure 6 is a sectional view thereof, Figure 7 is a plan view of the blade after it is etched, Figure 8 is a sectional view thereof, Figure 9 is a plan view of the blade in its finished state after it is ground, and Figure 10 is a sectional view.

Referring to these Figures, 1 denotes the blade the middle portion of which has a thickness of 0.15 mm. Along each of its cutting edges the blade has a marginal portion 3 the thickness of which is only about 0.1 mm. With this reduced thickness of about 0.1 mm. satisfactorily clean and fit cutting edges can be obtained by one sole grinding operation by means of a disk of sufficiently fine grain.

For the manufacture of the described razor blade I have further invented a suitable appliance that permits of a great number of blades to be etched in unison, an embodiment of this appliance being illustrated in Figures 1 to 3. As to be seen therefrom, the appliance consists in a base plate 4 having mounted on it two or three parallel bars 5 corresponding to the holes normally provided in razor blades. The blanks to be treated are slid on these bars in such a manner as to alternate with interposed plates 6 which consist of a material that is not attacked by the etching liquid such as celluloid, and the width of which corresponds to the thicker portion of the future blades. The margins to be reduced in thickness of the blade blanks thus project beyond the plates 6. After a pile of blanks 1 and plates 6 has been thus formed on the base plate 4, a strong presser plate 7 is put on the top of the pile and the blanks 1 and plates 6 are then so firmly pressed together by screwing nuts 8 onto the bars 5 that no etching liquid can enter between the plates and blanks.

The whole frame 4, 5, 7 with the blanks thereon is thereupon hung into a tank containing the etching liquid such as nitric acid, until the margins 3, 3 of the blanks have reached the desired reduced thickness. The frame is then lifted from the tank, washed and cleaned by means of brushes so that the etched margins of the blanks show a mat white color. After being removed from the frame, the blanks are ground in the usual manner, one sole grinding operation by means of one grinding disk for each side of the blade being sufficient to obtain a satisfactory cutting edge, as explained above.

While the drawings of this application show the cutting edge formed by beveling both sides of the blade to form the cutting edge, in some types of blades only one side of the blade is beveled to form the cutting edge. In this latter type of course one grinding disk would be sufficient to obtain a satisfactory cutting edge.

What I claim and desire to secure by Letters Patent is:—

1. A process for manufacturing a razor blade, consisting in manufacturing a blank of uniform thickness, reducing its thickness in the marginal range of its future cutting edges by an etching operation, and grinding cutting edges thereon.

2. A process for manufacturing a plurality of razor blades having along their cutting edges margins of smaller thickness than their middle portion consisting in manufacturing a plurality of blanks, forming a compressed pile consisting alternatively of said blanks and of plates of smaller width than these and of a material proof against the action of acids, dipping this pile in acid so as to cause the acid to reduce the exposed portions of the blades, and grinding the etched portions of the blades to form cutting edges.

3. The method of making a razor blade which consists in producing a blade blank of substantially uniform thickness, applying to all of the blade blank except marginal portions to be treated, a material to protect the blade except at its marginal portion or portions against the action of acids, then subjecting the unprotected portion of the blade to the action of an etching acid to reduce it to an intended thickness, and then grinding the etched portion of the blade to form a cutting edge.

4. The method of making a razor blade which consists in producing blade blank of substantially uniform thickness, applying to all of the blade blank except marginal portions to be treated, a material to protect the blade against the action of acids, then subjecting the unprotected portion of the blade to the action of an etching acid to reduce it to an intended thickness, washing off the acid, and then grinding the etched portion of the blade to form a cutting edge.

5. The method of making razor blades, which consists in producing blade blanks of substantially uniform thickness, disposing a plurality of such blades in a pile and covering all except marginal portions of the blades so as to protect the covered portions of the blades against the action of an acid, then subjecting the uncovered portions of all the blades to the action of an etching acid to reduce the thickness thereof, and then grinding the edges of the blades to form cutting edges.

In testimony whereof I affix my signature.

JULIUS TREIBER.